(12) United States Patent
Fujita et al.

(10) Patent No.: US 8,789,618 B2
(45) Date of Patent: Jul. 29, 2014

(54) OPTICAL DISC, OPTICAL DISC RECORDING METHOD, OPTICAL DISC REPRODUCTION METHOD, OPTICAL DISC DEVICE AND STORAGE SYSTEM

(75) Inventors: Shinji Fujita, Yokohama (JP); Osamu Kawamae, Kawasaki (JP); Masaaki Kurebayashi, Ebina (JP); Manabu Katsuki, Yokohama (JP)

(73) Assignees: Hitachi-LG Data Storage, Inc., Tokyo (JP); Hitachi Consumer Electronics Co., Ltd., Tokyo (JP)

( * ) Notice: Subject to any disclaimer, the term of this patent is extended or adjusted under 35 U.S.C. 154(b) by 319 days.

(21) Appl. No.: 13/180,619

(22) Filed: Jul. 12, 2011

(65) Prior Publication Data

US 2012/0047372 A1 Feb. 23, 2012

(30) Foreign Application Priority Data

Aug. 20, 2010 (JP) ................................. 2010-184541

(51) Int. Cl.
*G06F 12/14* (2006.01)

(52) U.S. Cl.
USPC .......................................... 173/193; 173/189

(58) Field of Classification Search
USPC .................................................. 713/193, 189
See application file for complete search history.

(56) References Cited

U.S. PATENT DOCUMENTS

| 7,448,086 | B2* | 11/2008 | Sako et al. ...................... 726/27 |
| 2002/0141577 | A1* | 10/2002 | Ripley et al. .................. 380/201 |
| 2003/0005309 | A1* | 1/2003 | Ripley et al. .................. 713/185 |
| 2004/0034787 | A1* | 2/2004 | Kitani ........................... 713/189 |
| 2004/0177262 | A1* | 9/2004 | Lee ................................ 713/193 |
| 2004/0196759 | A1* | 10/2004 | Ishibashi et al. ............ 369/47.19 |
| 2005/0044046 | A1* | 2/2005 | Ishiguro .......................... 705/57 |
| 2007/0211597 | A1* | 9/2007 | Kobayashi et al. ......... 369/59.23 |
| 2008/0022095 | A1* | 1/2008 | Kamio et al. ................. 713/165 |
| 2008/0049932 | A1* | 2/2008 | Ono et al. ........................ 380/44 |
| 2008/0069354 | A1* | 3/2008 | Kitani et al. .................. 380/202 |
| 2008/0152136 | A1* | 6/2008 | Kashihara .................... 380/200 |
| 2009/0238362 | A1* | 9/2009 | Kitani et al. .................... 380/44 |
| 2009/0282257 | A1* | 11/2009 | Senshu ......................... 713/182 |
| 2009/0310455 | A1* | 12/2009 | Uchiyama ................... 369/53.21 |
| 2010/0281275 | A1* | 11/2010 | Lee et al. ...................... 713/193 |

FOREIGN PATENT DOCUMENTS

JP 2007-336058 12/2007

* cited by examiner

*Primary Examiner* — Krisna Lim
(74) *Attorney, Agent, or Firm* — Antonelli, Terry, Stout & Kraus, LLP.

(57) ABSTRACT

A storage system having a plurality of optical disc devices allows other optical disc devices inside the storage system to reproduce the optical disc recorded by a certain optical disc device but inhibits optical disc devices outside the storage system to reproduce the optical disc. A device key as a base for generating an encryption key is common to the plurality of optical disc devices. In the optical disc devices, a guest key other than the device key can be used temporarily to generate the encryption key. An authentication list containing a reproduction condition is recorded with the key information to the optical disc.

9 Claims, 13 Drawing Sheets

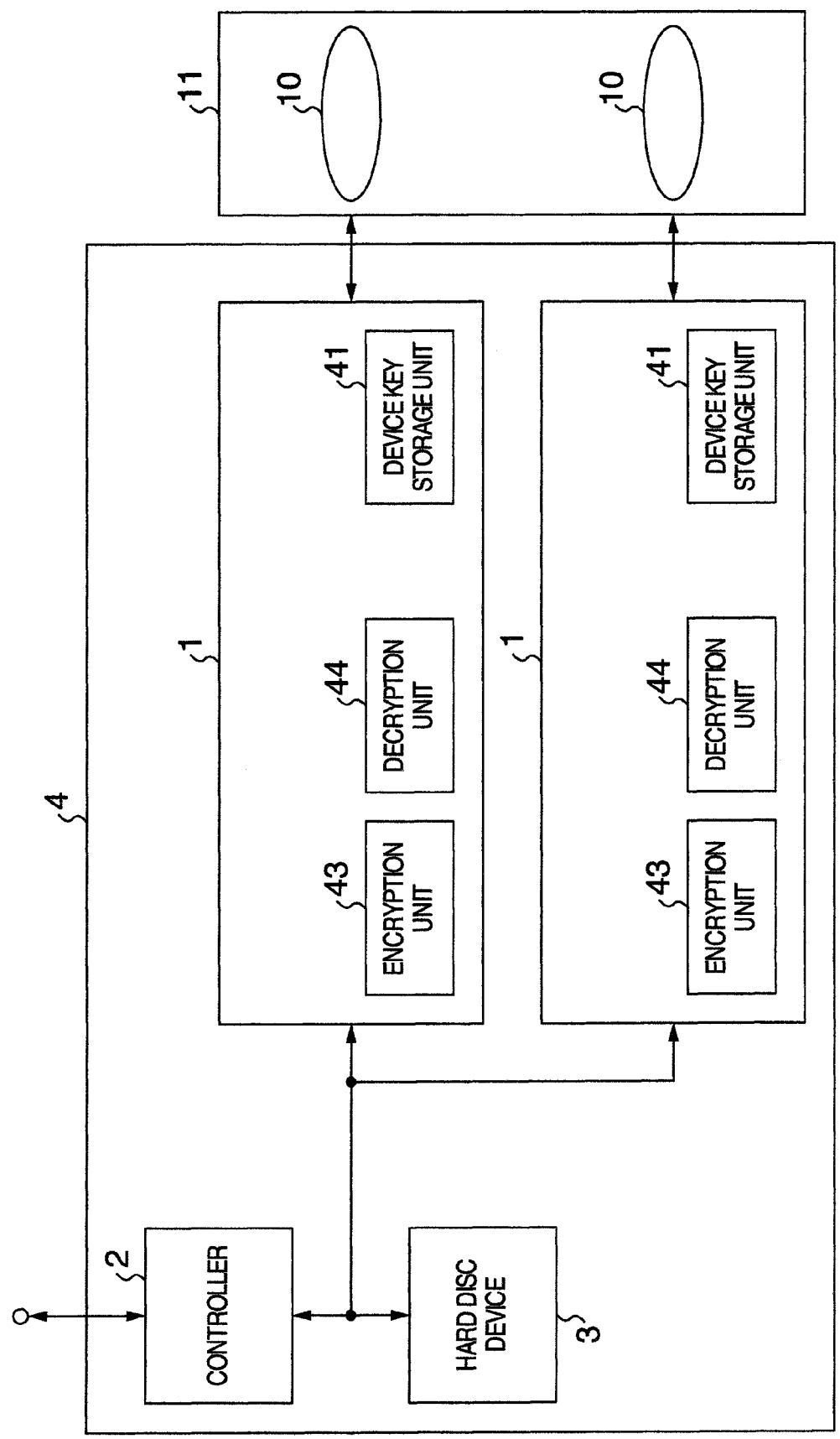

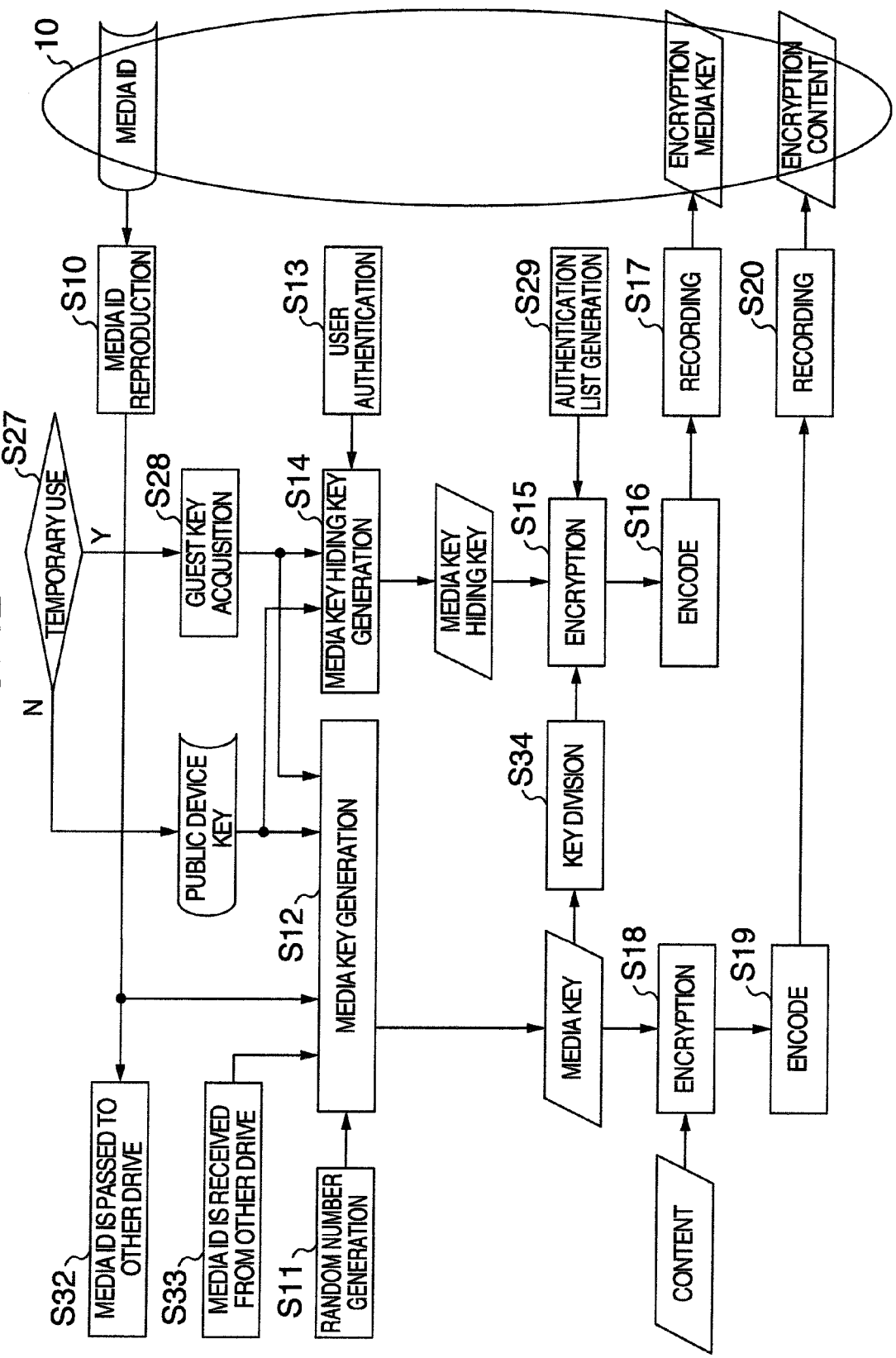

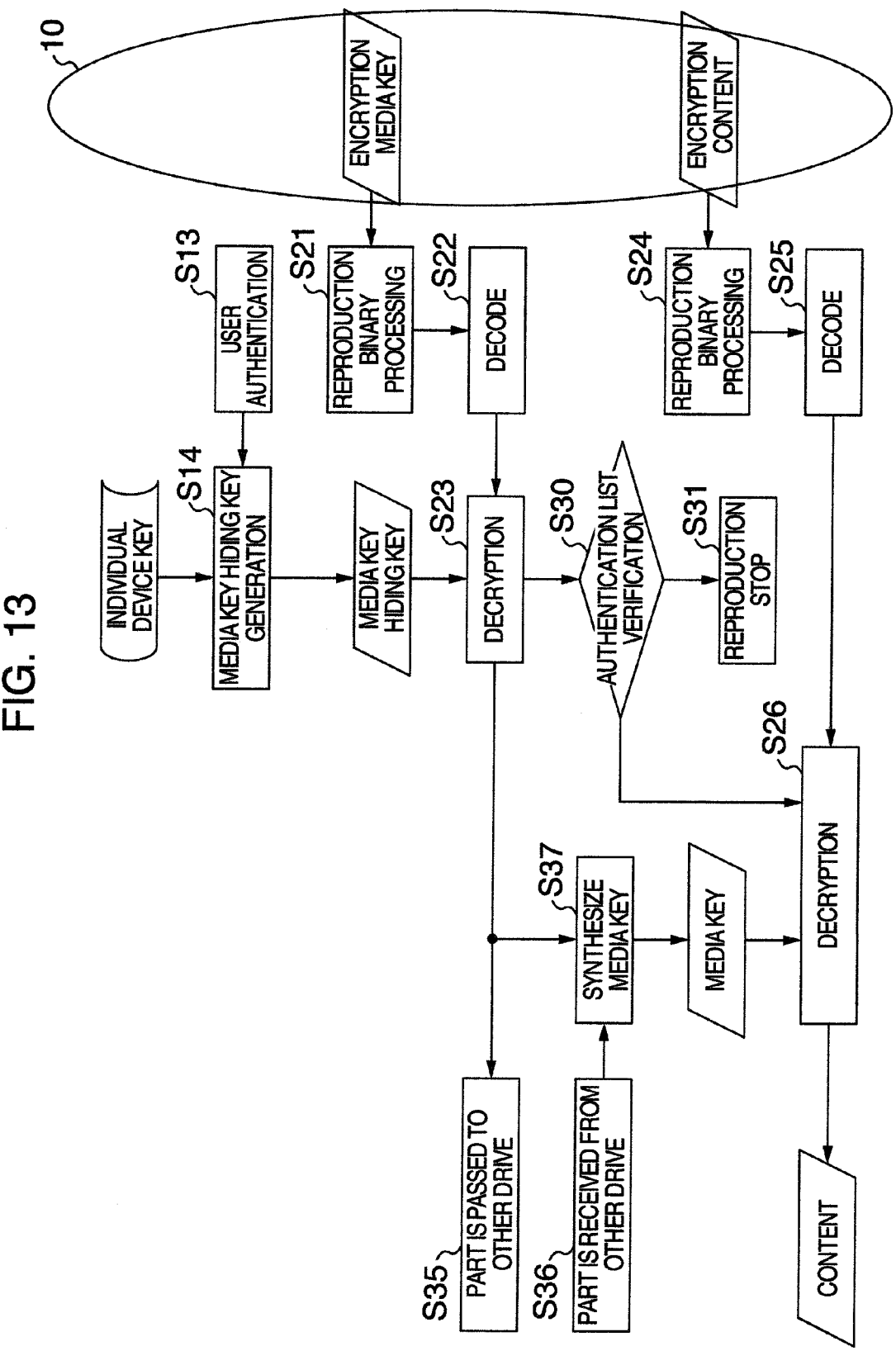

OPTICAL DISC, OPTICAL DISC RECORDING METHOD, OPTICAL DISC REPRODUCTION METHOD, OPTICAL DISC DEVICE AND STORAGE SYSTEM

INCORPORATION BY REFERENCE

The present application claims priority from Japanese application JP2010-184541 filed on Aug. 20, 2010, the content of which is hereby incorporated by reference into this application.

BACKGROUND OF THE INVENTION

This invention relates to an optical disc device. More particularly, the invention relates to an optical disc device and a storage system that protect information by encrypting data.

CSS (Content Scramble System), CPRM (Content Protection for Recordable Media) and AACS (Advanced Access Content System) are known as technologies having an encryption function for protecting copyrights from illegal copies in optical disc devices US2008/00222095A1 (JP-A-2007-336058) (patent document 1) discloses a technology for utilizing the AACS in write-once media not capable of overwriting files. This patent document reads as follows. "In AACS, a plurality of keys is encrypted by using a device key assigned to each device for legally recording and reproducing content and a random number generated at random, is registered to a key file with the random number and is recorded to a recording medium. To reproduce the content, the encryption key registered to this key file is decrypted by using the random number and the device key to be reproduced. The content is reproduced by using the key so decrypted and the content is reproduced."

The document further describes as follows. "MKB is referred to as "Media Key Block" and a media key Km is encrypted and recorded. The MKB records information of illegal devices, too, and the illegal devices are not allowed to take out the media key Km." "The MKB encrypts and saves information necessary for generating a protected area key (Kpa) and contains Revoke Information (cancel information or nullification information). In other words, a security hole exists in a certain device key set and when a licenser inhibits the use of the corresponding device key Kd, revoke information about the corresponding device key Kd is described. The device having the corresponding device key Kd is not able to solve the cipher owing to this revoke information."

SUMMARY OF THE INVENTION

Read-only optical discs such as CD (Compact Disc), DVD, BD (Blu-ray Disc), etc, have gained a wide application as distribution media of digital contents because they are suitable for mass production and have high compatibility among devices. On the other hand, recordable optical discs have been developed in the CD, DVD and BD and have been utilized as external information storage devices for PC (Personal Computer), for example, and the content protection means described above such as CSS, CPRM and AACS have been put into practical application to prevent illegal copies of the contents the copyrights of which is to be protected.

These content protection means are directed to prevent illegal copy of the distributed media and reproduction is possible in all the devices having the content protection means mounted thereto except inhibition of reproduction for the illegal devices recognized by the licenser.

When the optical disc is used as an external storage medium not directed to distribution, on the other hand, there are demands for limiting the devices capable of reproducing the recorded optical discs to prevent leaks of personal information and corporate secret.

For example, there is the demand that although other optical disc devices in a predetermined storage system having a plurality of optical disc devices can reproduce the optical disc recorded by a certain one of these optical disc devices, optical disc devices outside this storage system are not allowed to reproduce the optical disc.

When ease-of-use is taken into consideration, it is desired that authentication through a network is unnecessary during reproduction.

It is therefore an object of the invention to provide an optical disc device capable of arbitrarily limiting optical disc devices capable of reproducing recorded optical discs without relying on the authentication by a third party.

To accomplish this object, the invention employs the constructions described in the appended claims, by way of example.

The invention can accomplish an optical disc device that can limit reproducible devices of recorded optical discs without relying on authentication through a network. Therefore, the invention can reinforce information protection of optical discs as removable media against leak and manipulation.

Other objects, features and advantages of the invention will become apparent from the following description of the embodiments of the invention taken in conjunction with the accompanying drawings.

BRIEF DESCRIPTION OF THE DRAWINGS

FIG. 11 is block diagram showing a storage system in a sixth embodiment;

FIG. 12 is a flowchart showing a procedure for encrypting content data and storing it into an optical disc in the sixth embodiment; and FIG. 13 is a flowchart showing a procedure for reproducing the content data encrypted and stored in the optical disc in the sixth embodiment;

DESCRIPTION OF THE EMBODIMENTS

Optical disc devices and storage systems according to preferred embodiments of the invention will be explained in detail with reference to the accompanying drawings.

Embodiment 1

The construction of the storage system according to the first embodiment of the invention and its operation will be explained in detail with reference to the drawings.

Figure 2:
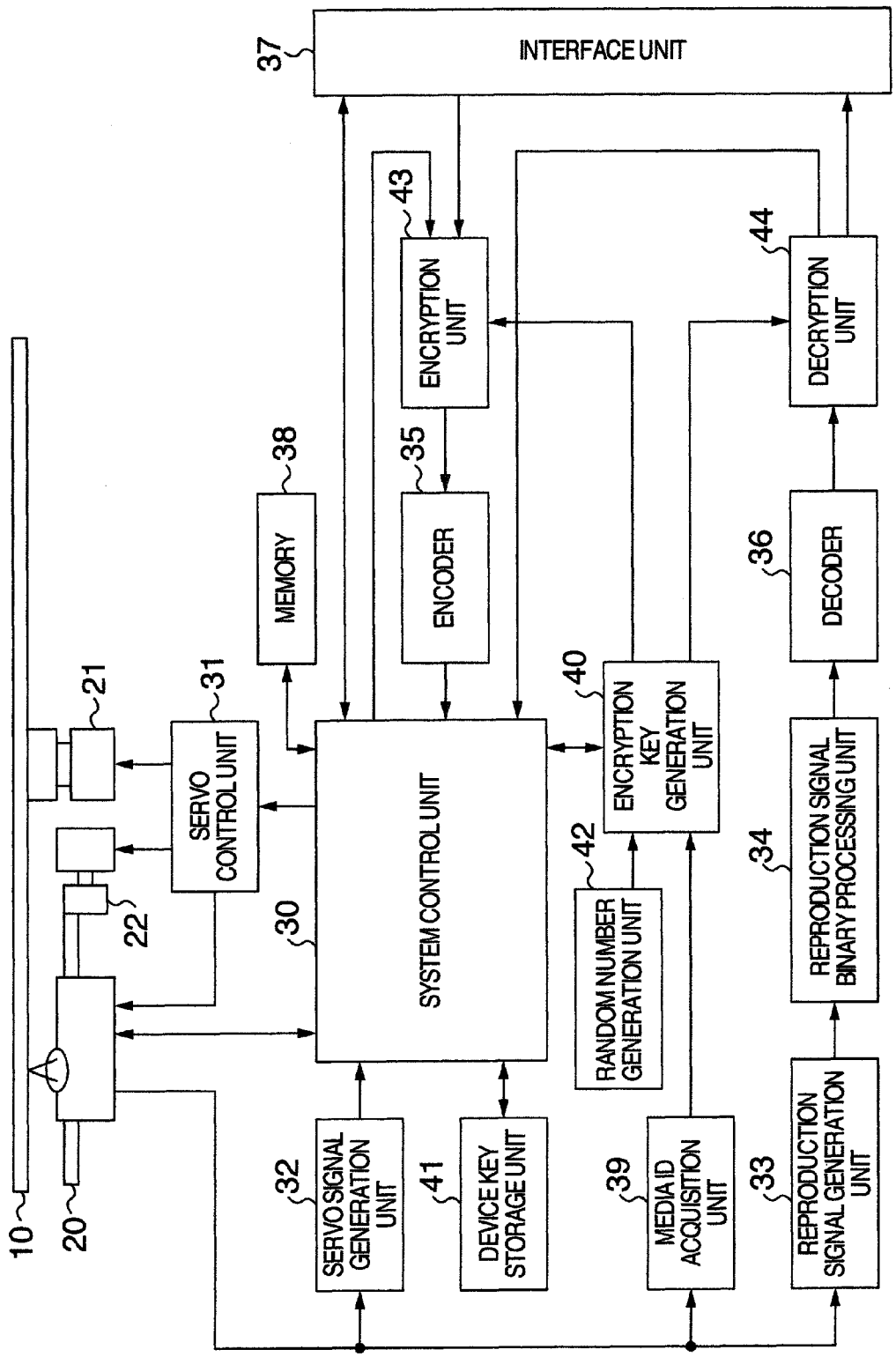
FIG. 2 is a block diagram showing an optical disc device in the first embodiment.

FIG. 2 is a block diagram of the optical disc device in the first embodiment. The optical disc device of this embodiment includes an optical pickup 20, a spindle motor 21, a slider mechanism 22, a system control unit 30, a servo control unit 31, a servo signal generation unit 32, a reproduction signal generation unit 33, a reproduction signal binary processing unit 34, an encoder 35, a decoder 36, an interface unit 37 for exchanging data with a host device and a memory 38 for storing temporarily system control information. The optical disc device further includes a media ID acquisition unit 39, an encryption key generation unit 40, a device key storage (saving) unit 41, a random number generation unit 42, an encryption unit 43 and a decryption unit 44.

A semiconductor laser as a light source is mounted to the optical pickup 20. An objective lens allowed to undergo displacement in both focusing and tracking directions by an actuator condenses the laser flux emitted from the semiconductor laser as an optical spot to a predetermined information recording layer of the optical disc 10. The optical disc device further includes a photo detector for receiving reflected light from the optical disc 10 and converting it to an electrical signal.

The system control unit 30 has the function of controlling the overall operations of the optical disc device of this embodiment. More concretely, the system control unit 30 controls the revolution of the optical disc 10 mounted to the spindle motor 21 through the servo control unit 31, drives the slider mechanism 22 to execute seek and feed controls for causing the optical pickup 20 to undergo displacement in the radial direction and drives the actuator of the optical pickup 20 to execute focusing and tracking controls of the objective lens. The system control unit 30 executes the driving control of the semiconductor laser of the optical pickup 20, allows continuous light emission at predetermined power during reproduction and during recording, allows light emission in a write strategy (light emission pulse train) corresponding to an NRZI signal in conformity with a predetermined modulation rule. The system control unit 30 further executes a later-appearing encryption processing.

The reflected flux from the optical disc 10 is converted to the electric signal by the photo detector and is sent to both servo signal generation unit 32 and reproduction signal generation unit 33. The electric signal is sent to the media ID acquisition unit 39, too. The servo signal generation unit 32 selects and generates various servo signals suitable for the optical disc 10 mounted, and supplies them to the system control unit 30. The servo signal includes at least a focus error signal and a tracking error signal. The system control unit 30 executes the focus control and the tracking control of the optical spot on the basis of these servo signals through the servo control unit as described already.

The reproduction signal generation unit 33 has a waveform equalization unit and an A/D convertor, executes sampling and quantization for an analog reproduction signal supplied from the optical pickup 20 after a predetermined waveform equalization processing, converts the analog reproduction signal to a digital signal and supplies the resulting signal to a reproduction signal binary processing unit 34.

The reproduction signal binary processing unit 34 includes a transversal filter, a Viterbi decoder and a PRML reproduction system parameter setting circuit. The digital signal supplied from the reproduction signal generation unit 33 is equalized to a predetermined PR class by the transversal filter. The Viterbi decoder executes maximum likelihood decoding and converts the equalization waveform to an NRZI signal on the basis of a predetermined modulation rule. The PRML reproduction system signal parameter setting unit has a function of setting a tap coefficient of the transversal filter and an identification point level in the Viterbi decoder.

The media ID acquisition unit 39 reads out a media ID unique to the optical disc 10 mounted. The media ID is recorded in advance in the bar code form during the fabrication of the disc to a position on the more inner circumferential side than the ordinary data area, for example. The media ID so acquired is supplied to an encryption key generation unit 40.

The encryption key generation unit 40 receives the random number signal generated by the random number generation unit 42 and the device key information stored in a device key storage unit 41 besides the media ID and generates the encryption key necessary for encryption and decryption on the basis of these kinds of information.

The device key storage (saving) unit 41 cannot be accessed from outside by a series of command sets laid open to public for controlling the optical disc device and is hidden so that users cannot easily retrieve or rewrite the content.

The encryption unit 43 receives the encryption key from the encryption key generation unit 40, executes the encryption processing for the input data in accordance with a predetermined algorithm and supplies the data so encrypted to the encoder 35. The encoder 35 converts the data encrypted in accordance with the predetermined modulation rule to the NRZI signal. The signal is then converted to the corresponding write strategy by the system control unit 30 and is recorded to the optical disc 10.

On the other hand, the NRZI signal read out from the optical disc 10 and converted by the reproduction binary processing unit 34 is sent to the decryption unit 36 and is converted in accordance with the predetermined modulation rule. The data hereby converted is the encrypted data and is supplied to the decryption circuit 44.

The decryption unit 44 receives the encryption key from the encryption key generation unit 40 and executes the decryption processing for the data supplied in accordance with the predetermined algorithm.

Figure 3:
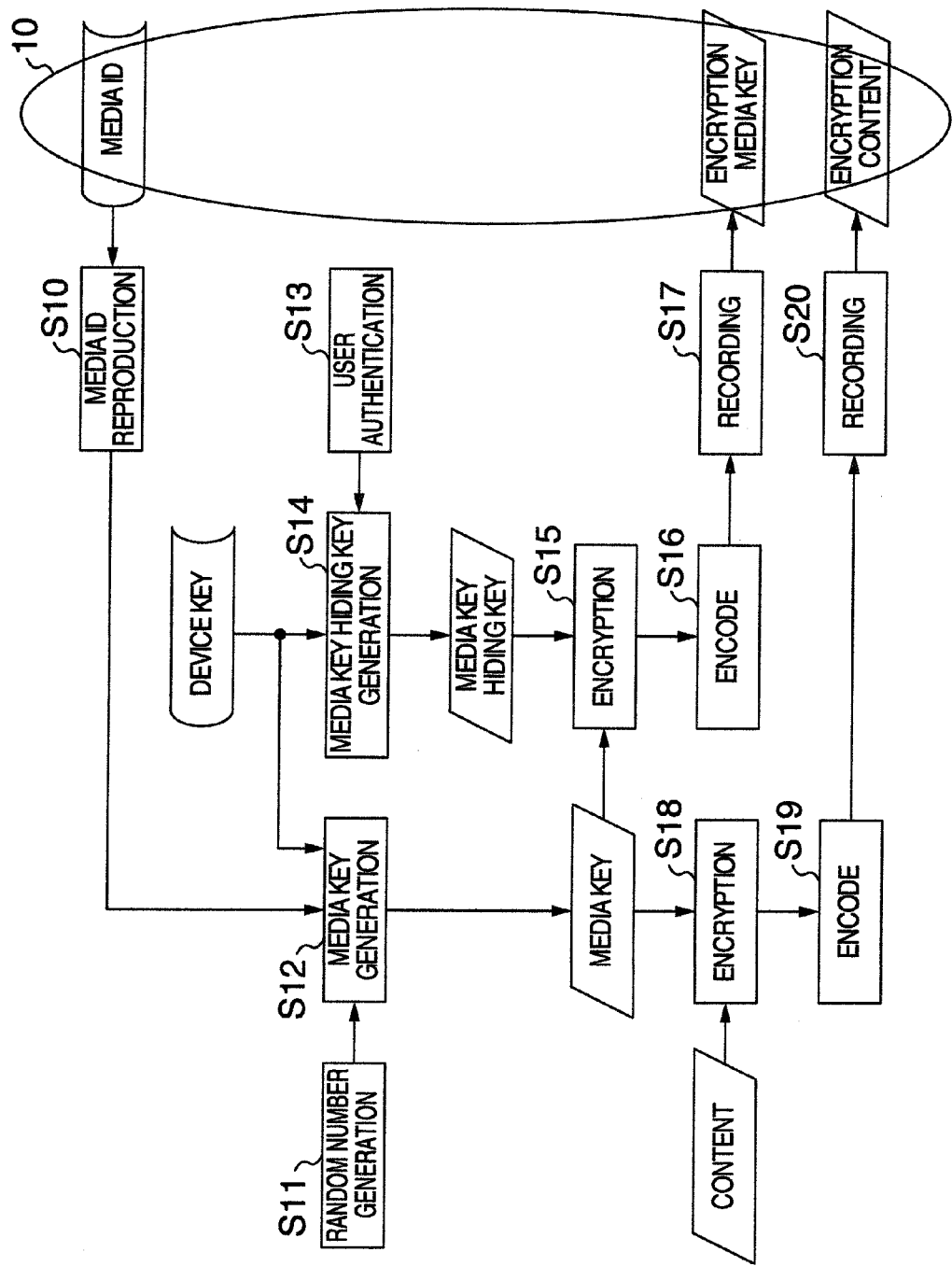
FIG. 3 is a flowchart showing a procedure for encrypting content data and recording it into an optical disc in the first embodiment.

FIG. 3 is an explanatory view for explaining the processing procedure for encrypting and recording the content data to the optical disc in the first embodiment.

When recording, the media ID acquisition unit 39 first reproduces in Step S10 the media ID recorded in advance to the optical disc 10 mounted. The media ID so reproduced is sent to the encryption key generation unit 40.

In the next Step 11, the random number generation unit 42 generates a random number of a predetermined number of digits and sends it to the encryption key generation unit 40. The system control unit 30 reads out the device key from the device key storage unit 41 and sends it to the encryption key generation unit 40.

In Step 12, the encryption key generation unit 40 generates a media key on the basis of the media ID, the random number having a predetermined number of digits and the device key received. The media key is temporarily saved in the memory 38.

In S13, user authentication is made. Authentication by a password or biometric authentication is made by using an external device and the optical disc device receives the authentication result.

In Step S14, the encryption key generation unit 40 generates a media key hiding key on the basis of the device key when user authentication is made in S13. Incidentally, the device key and the media key hiding key correspond to each other on the 1:1 basis because the random number is not utilized unlike the media key.

In S15, the media key is encrypted. The media key stored in the memory 39 is handed over as data to the encryption unit 43 and the media key hiding key generated in S14, as the encryption key. The media key is encrypted in accordance with a predetermined encryption algorithm.

In S16, the media key encrypted by the encryption unit 35 is encoded in accordance with a predetermined modulation rule and is recorded to a predetermined media key recording area of the optical disc 10 in S17.

In the next step S18, the content data is encrypted. The content data inputted from the external device through the interface unit 37 is handed over as the data to the encryption unit 43 and the media key generated in S12, as the encryption key, respectively, to generate the encrypted content data in accordance with a predetermined encryption algorithm.

In S19, the encoding unit 35 encodes the encoded content data in accordance with a predetermined modulation rule and the data is recorded to the user data area of the optical disc 10 in the next step 20.

Figure 4:
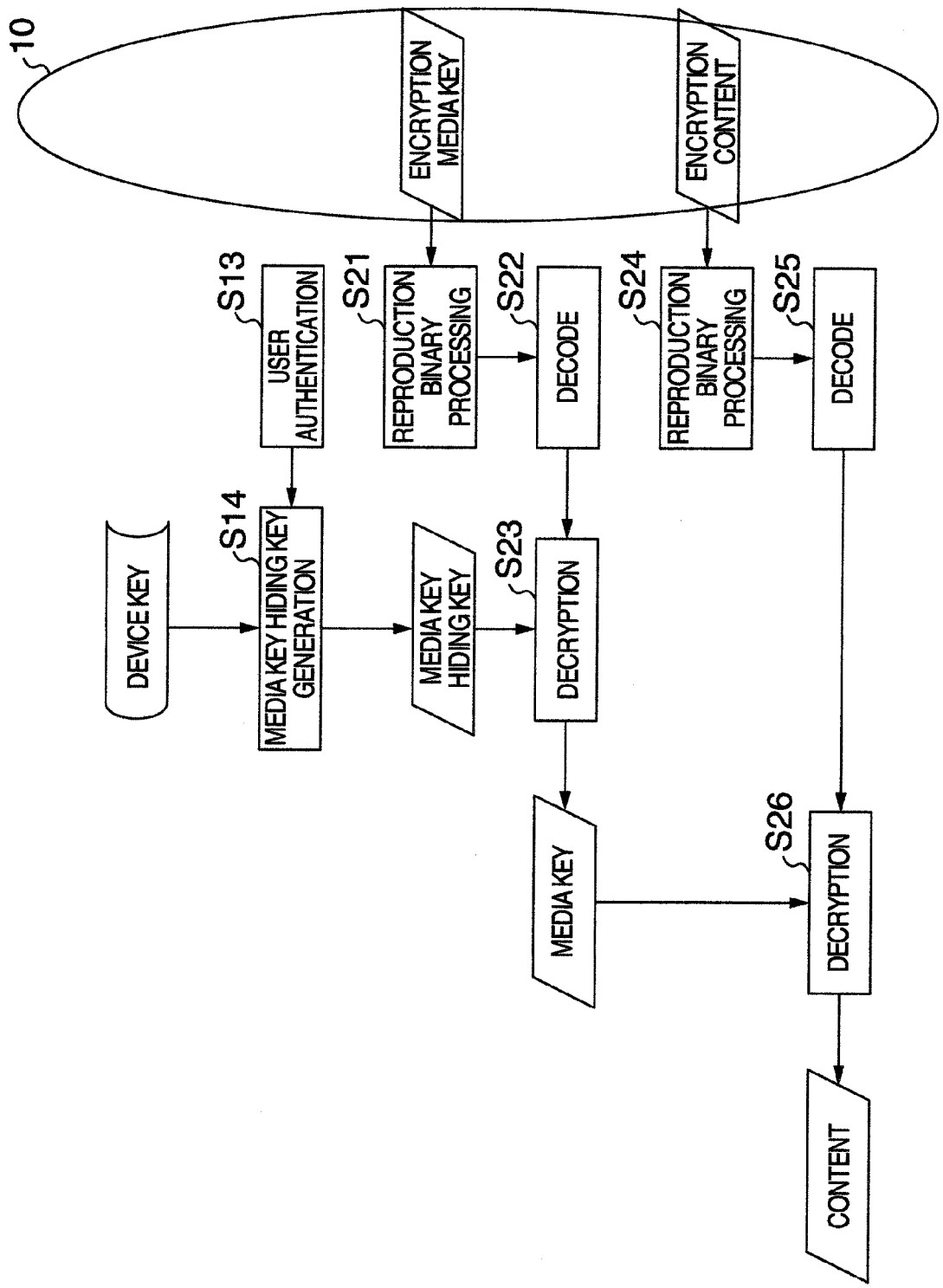
FIG. 4 is a flowchart showing a procedure for reproducing the content data encrypted and stored in the optical disc in the first embodiment.

FIG. 4 is an explanatory view for explaining the processing procedure for generating the encoded and recorded content data in the optical disc in the first embodiment.

To make reproduction, user authentication is first made in S13 by using the external device and the authentication result is received.

When the user is authenticated in S13, the encryption key generation unit 40 generates the media key hiding key on the basis of the device key in S14. The media key hiding key generated at this time is the same as the media key hiding key generated at the time of recording.

In S21, the encoded media key is read out from the predetermined media key recording area of the optical disc and is subjected to binary processing by the reproduction signal binary unit 34. The decoder 36 decodes the data in accordance with a predetermined modulation rule and sends it to the decryption unit 44.

The media key is decrypted in S23. The decryption unit 44 executes the decryption processing by using the media key hiding key generated by the decryption unit 44 in S14 as the encryption key and the encrypted media key information decoded in S22 as the data, and acquires the media key. The media key so acquired is temporarily stored in the memory 38.

In the next step S24, the encrypted content data recorded to the optical disc 10 is read out and is subjected to binary processing. In S25, the decoding processing is executed and the data is sent to the decryption unit 44.

In S26, the decryption unit 44 executes the decoding processing of the encrypted content data encoded in accordance with a predetermined algorithm by using the media key acquired in S23 as the encryption key. The encrypted content date is decrypted to a plain text and is then outputted through the interface unit 37.

Incidentally, the reproduction right can be assigned to each user or each user group by employing the construction in which the optical disc device receives a user ID or a user group ID to which the users belong in S13 and the encryption key generation unit 40 generates the media key hiding key on the basis of the user ID or the use group ID and the device key.

Figure 1:
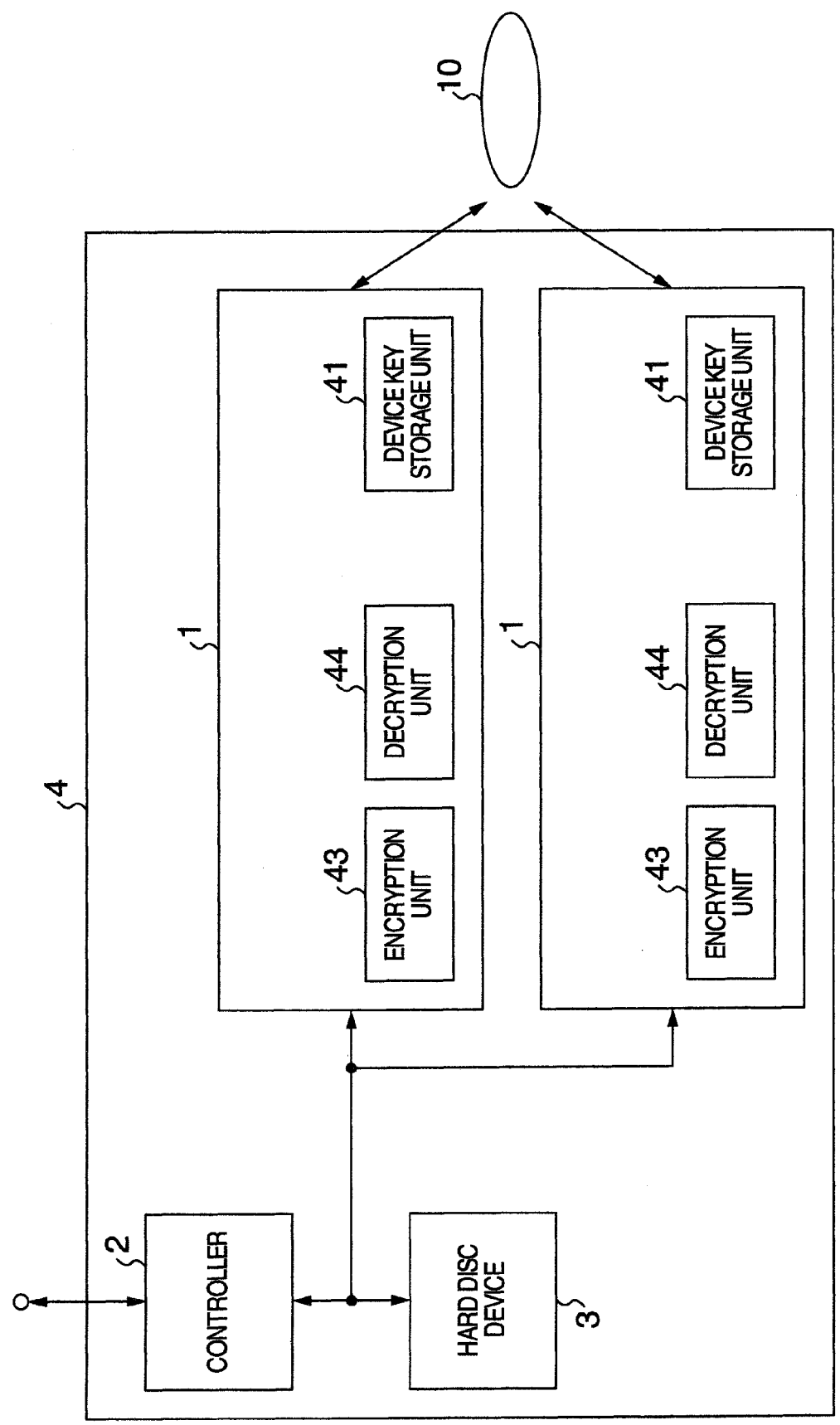
FIG. 1 is a block diagram showing a storage system in a first embodiment of the invention.

FIG. 1 is a block diagram of the storage system in the first embodiment. Both of the optical disc devices 1 are the optical disc devices shown in FIG. 2. Each of the optical disc devices includes the device key storage unit 41, the encryption unit 43 and the decryption unit 44. It further includes the controller 2 and the hard disc device 3.

The controller 2 controls the storage system of this embodiment as a whole. The controller 2 is connected to the external device through the interface and exchanges commands and data in a predetermined protocol. The controller 2 receives the content data in accordance with the request of the external device, temporarily stores it in the hard disc device 3 and manages the data transition period. The controller 2 encrypts and recodes the content data of the hard disc device 3 to the optical disc 10 at a predetermined timing through the optical disc device 1. In this case, the controller 2 manages the proper use of the two optical disc devices 1. The controller 2 further has the function of reading out the encrypted content data on the optical disc 10 and transmitting it as the content data of the plain text to meet with the request of the external device.

The hard disc device 3 has the area for temporarily caching the content data received from the external device and the area for storing the application software and the management database of the controller 1 as described already.

The device key storage unit 41 mounted to the optical disc device 1 holds the device key of each optical disc device. In this embodiment, a construction is employed such that at least a part of the content of the device key is in common. However, the construction is such that the length functioning sufficiently as the key is in common and the common portion of the device key generates the media key hiding key in the operation of the optical disc device of the embodiment described above. In this embodiment, the media key hiding key is a so-called "common key" for executing encryption and decryption by using the same key and each optical disc device 1 as the base unit has one device key.

In this embodiment, the device key storage unit 41 is an OPTPROM (One Time Programmable Read-Only Memory) and the device key information is set in advance by a supplier of the storage system or a manufacturer of the optical disc device.

Because the device keys of a plurality of optical disc devices in the storage system are used in common as in this embodiment, the optical disc 10 encrypted and recorded by any one of the optical disc devices 1 in the storage system can be reproduced by any optical device 1 in the same storage system. In this instance, the necessity for the authentication by a third party through the network can be eliminated. It is also possible to limit reproduction because the device keys are different among the optical disc devices of the different storage systems and a proper media key cannot be generated.

In the foregoing explanation, the two optical disc devices of this embodiment employ the construction for executing recording and reproduction independently of each other. However, when the device keys are made common as in this embodiment, encryption and decryption can be executed appropriately without the necessity for recognizing which optical disc 10 corresponds to which optical disc device 1 when a parallel processing is carried out for a plurality of optical discs 10 mounted independently to a plurality of optical disc devices 1 constituting RAID (Redundant Array of Independent Discs), too.

Embodiment 2

Figure 5:
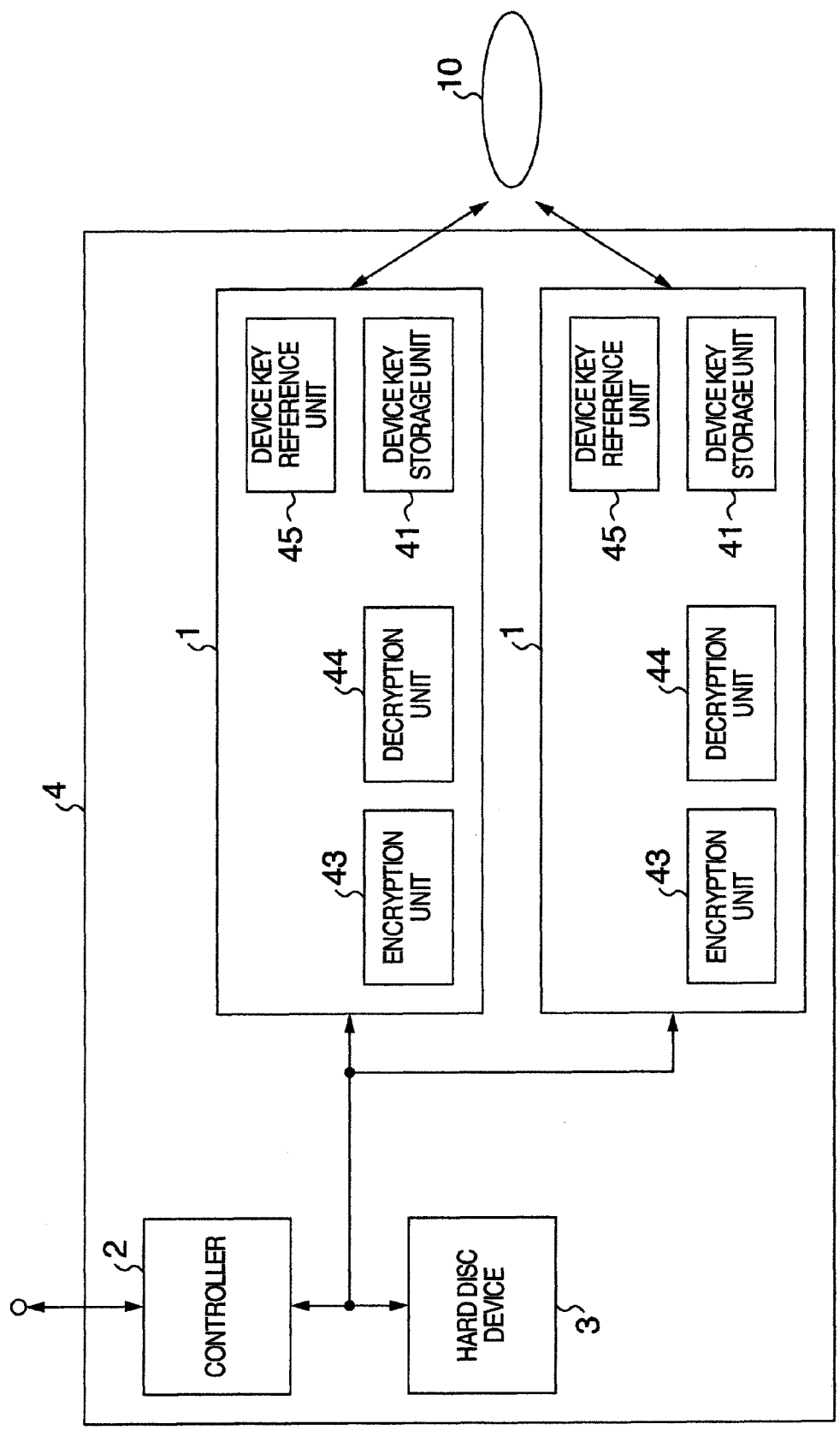
FIG. 5 is a block diagram showing a storage system in a second embodiment.

FIG. 5 is a block diagram of a storage system in the second embodiment. The difference of the second embodiment from the first embodiment resides in that the optical disc device 1 includes a device key reference unit 45 in addition to the construction shown in FIG. 2. In this embodiment, the device key storage unit 41 is a rewritable non-volatile memory and initial values are set in advance by a manufacturer of the optical disc device. The other constructions and operations are the same as those of the first embodiment and the explanation will be omitted.

The device key reference unit 45 of this embodiment has the function of looking up the device key stored by the device key storage units 41 of other optical devices 1 connected to the optical disc device 1. The unit 45 further has the function of specifying both source and destination optical disc devices.

When a new optical device or devices 1 are introduced to the storage system 4 by expansion or replacement, the existing optical disc device(s) 1 is detected and the new optical disc device(s) and the existing optical disc device(s) confirm that they are appropriate optical disc devices on the basis of the maker information, the model information, the serial numbers, and so forth. Illegal reference can be excluded by mutual authentication through electronic signature, or the like.

Next, the optical disc device 1 introduced afresh looks up the device key of the existing optical disc device 1 and records it to the device key storage unit 41 of its own. In other words, the new optical disc device 1 copies the device key and makes it common among the optical disc devices.

In this embodiment, too, the device keys of a plurality of optical disc devices in the storage system are made common and the optical disc 10 encrypted and recorded by any of the optical disc devices 1 inside the storage system can be reproduced by any other optical disc devices 1 inside the same storage system. Reproduction in the optical disc devices in a different storage system can be restricted. Authentication by the third party in the network is not necessary.

Alternatively, priority of the optical disc devices 1 in the storage system 4 is determined in advance and the device key reference unit 45 looks up the device key of the optical disc device 1 of the first order whenever encryption and decryption is made. When this construction is employed, the same effect can be acquired without the necessity for copying the key. Replacement of the optical disc device 1 of the first order can be made smoothly when the device key or the device key storage unit 41 is so constituted as to be capable of migrating to other optical disc devices 1.

Embodiment 3

Figure 6:
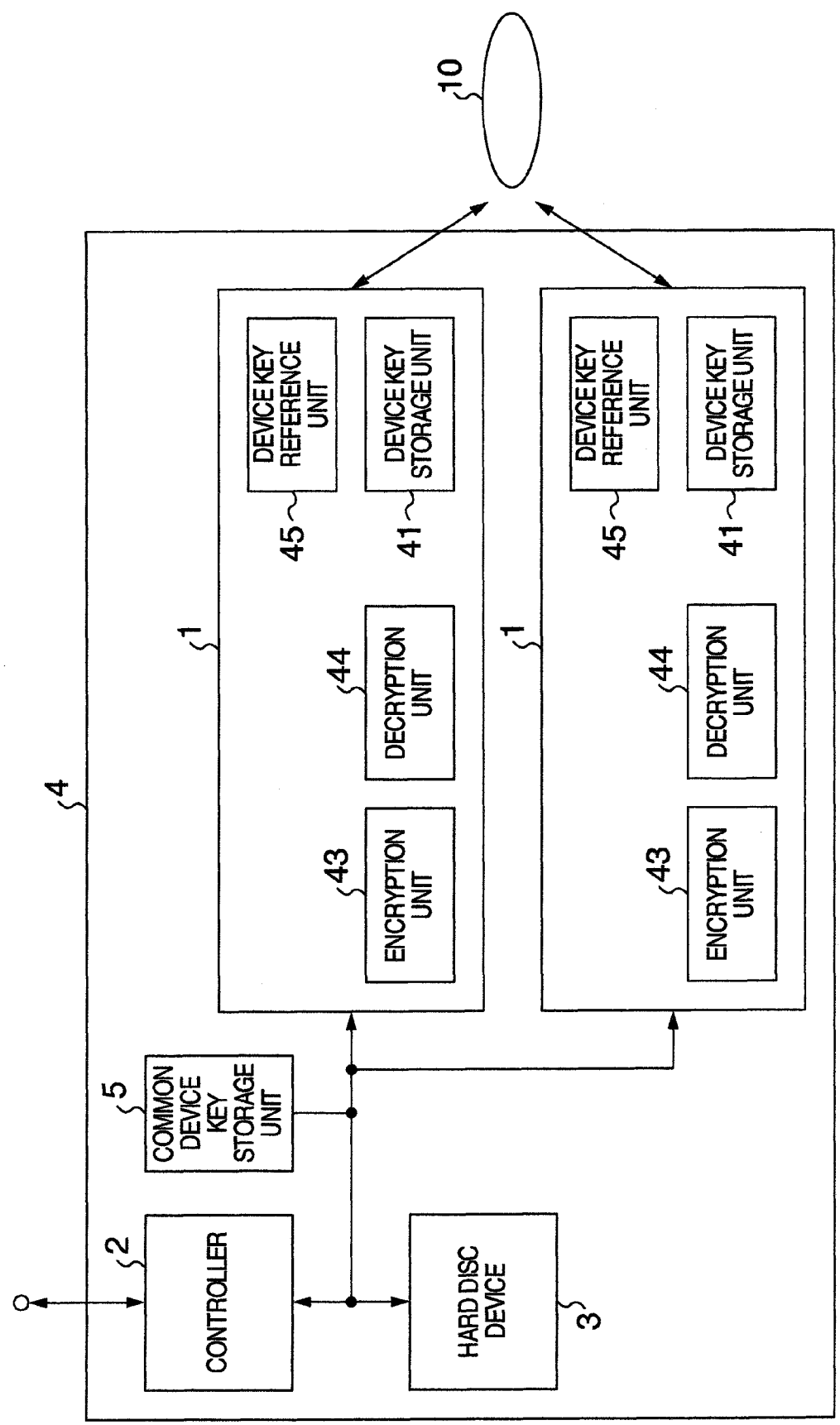
FIG. 6 is a block diagram showing a storage system in a third embodiment.

FIG. 6 is a block diagram of a storage system in the third embodiment. The difference of this embodiment from the second embodiment resides in that a common device key storage (saving) unit 5 is provided independently of each optical disc device 1. In this embodiment, the device key reference unit 45 has the function of looking up the device key stored in the common device key storage unit 5 connected to each disc device 1. The other constructions and operations are the same as those of the first and second embodiments and the explanation will be omitted.

The common device key storage unit 5 has the function of saving the device key used in the optical disc device 1 and the device information is set in advance by the supplier of the storage system or the manufacturer of the common device key storage unit 5. The unit 5 further has the function of specifying the source optical disc device of reference. Privacy of the device key can be secured by employing the construction in which the device key information is disclosed to only the request from the authenticated optical device 1.

The optical disc device 1 acquires the device key from the common device key storage unit 5 to execute encryption and decryption. In other word, to execute encryption, the system control unit 30 of the optical disc device 1 reads out the device key from the common device key storage unit 5 through the device key reference unit 45, sends it to the encryption key generation unit 40 and generates the media key on the basis of the media ID accepted in S14 and a predetermined random number. The system control circuit 30 further generates the media key hiding key on the basis of the device key in S14. Similarly, to execute decryption, the system control unit 30 reads out the device key from the common device key storage unit 5 through the device key reference unit 45, sends it to the encryption key generation unit 40 and generates the media key hiding key on the basis of the device key in S14.

In the embodiment described above, each optical disc device 1 is so constituted as to look up the common device key storage unit 5 to acquire the device key. In this way, it becomes possible to make common the device keys of a plurality of optical disc devices in the storage system and to reproduce the optical disc 10 encoded and recorded by any of the optical disc devices in the same storage system by any optical disc device 1 in the same storage system. It becomes also possible to limit reproduction in the optical disc device in a different storage system. Authentication of the third party in the network becomes unnecessary.

Embodiment 4

There is sometimes the case where reproduction by a specific optical disc device outside the storage system is desired when reproduction by the optical disc devices is limited. This embodiment will explain the construction capable of accomplishing this object.

Figure 7:
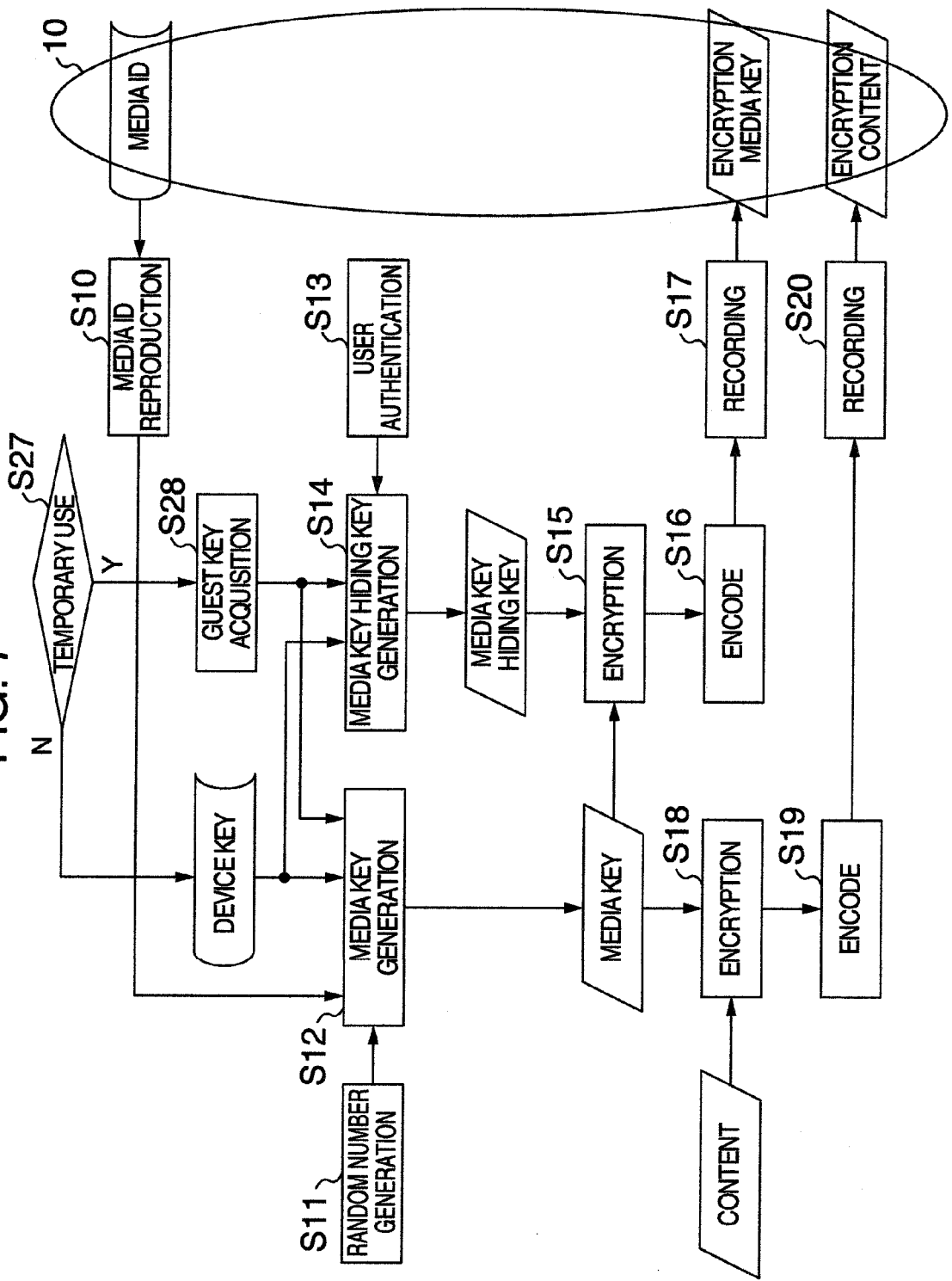
FIG. 7 is a flowchart showing a procedure for encrypting content data and storing it into an optical disc in a fourth embodiment.

FIG. 7 is an explanatory view for explaining a processing procedure for encrypting the content data and recording it to the optical disc in the fourth embodiment. The difference from the first embodiment is that a guest key different from the device key used ordinarily by the optical disc device 1 is added to the construction.

In S27, whether a temporary encryption processing with reproduction by the optical disc device outside the storage system as the premise or an ordinary encryption processing is to be executed is judged. As for the ordinary encryption processing, the encrypted content data is recorded to the optical disc 10 in accordance with the processing procedure similar to that of the first embodiment.

When the temporary encryption processing is executed, on the other hand, the guest key is acquired in S28. The controller 2 generates the guest key in accordance with a predetermined modulation rule on the basis of an arbitrary character string such as the password inputted by the user or the file data designated by the user, The guest key is sent to the optical disc device 1, is supplied to the encryption key generation unit 40 through the system control unit 30 and is used for generating the media key in S12 and the media key hiding key in S14.

This embodiment executes recording to the optical disc 10 in the same way as the first embodiment using the device key with the exception that the guest key is used for generating the media key and the media key hiding key.

Figure 8:
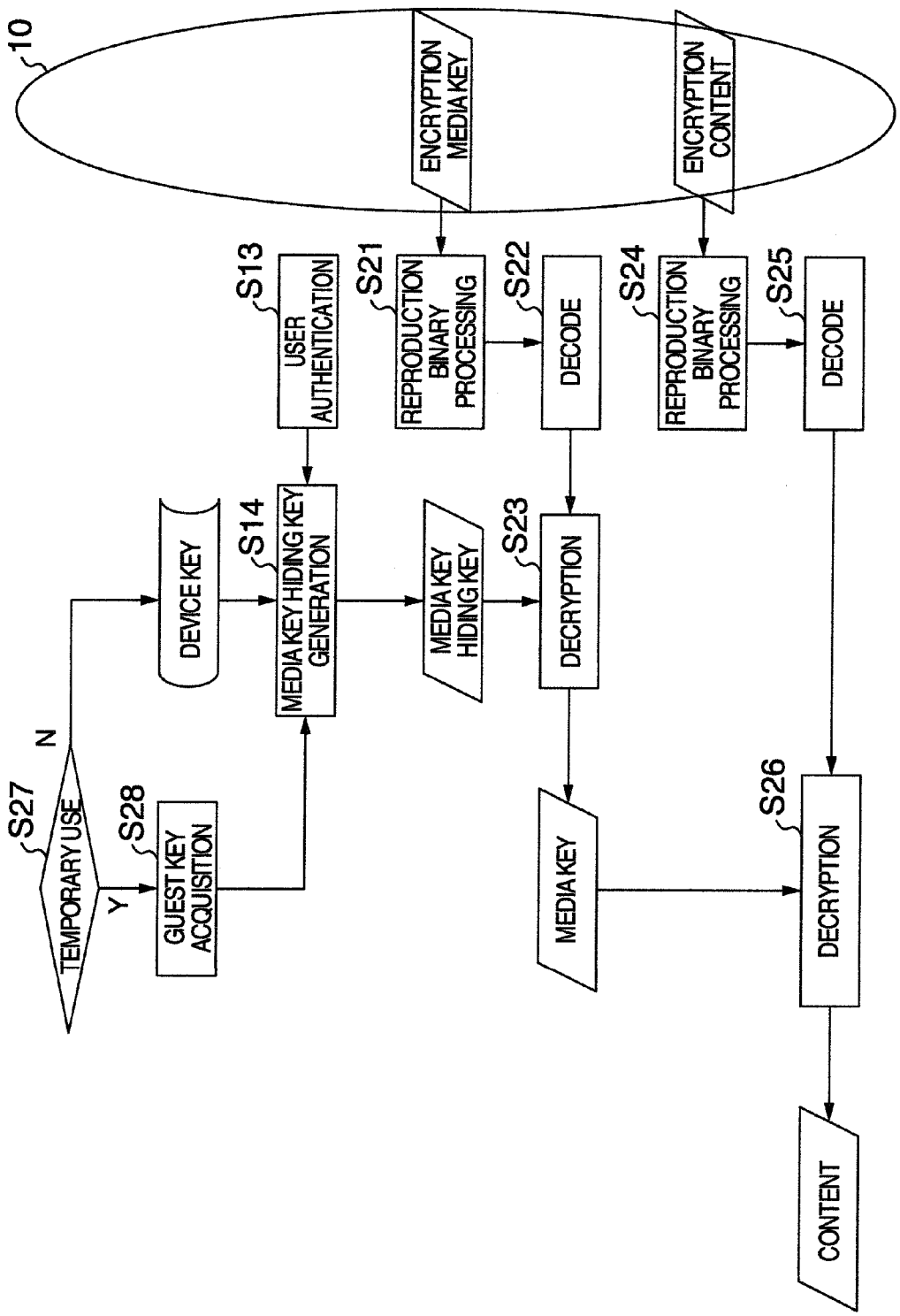
FIG. 8 is a flowchart showing a procedure for reproducing the content data encrypted and stored in the optical disc in the fourth embodiment.

FIG. 8 is an explanatory view for explaining a processing procedure for reproducing the content data encrypted and recorded to the optical disc in the fourth embodiment. The difference from the first embodiment is that a guest key is added to the construction in the same way as in the case of recording.

In S27, whether a temporary decryption processing with reproduction of the optical disc 10 recorded by the optical disc device outside the storage system as the premise or an ordinary decryption processing is to be executed is judged. As for the ordinary decryption processing, the encrypted content data is reproduced from the optical disc 10 in accordance with the processing procedure similar to that of the first embodiment.

When the temporary decryption processing is executed, on the other hand, the controller 2 generates the guest key as the key for recording in S28 in accordance with a predetermined modulation rule on the basis of an arbitrary character string such as the password inputted by the user or the file data designated by the user, The guest key is sent to the optical disc device 1, is supplied to the encryption key generation unit 40 through the system control unit 30 and is used for generating the media key hiding key in S14.

This embodiment executes reproduction of the data from the optical disc 10 in the same way as the first embodiment using the device key with the exception that the guest key is used for generating the media key hiding key.

Incidentally, this embodiment uses the construction for generating the guest key by the controller 2 but can further improve privacy of the key by generating the guest key by the system control unit 30 inside the optical disc device 1. Reliable guest key management can be made independently of the difference of the guest key generation algorithm when the user inputs directly the guest key or designates it by the file.

As described above, this embodiment employs the construction capable of switching the device key used ordinarily to the temporary guest key and shares commonly the information of the guest key among the optical disc devices belonging to the different storage systems. In this way, the embodiment can generate the optical disc encrypted in such a fashion that the device key information can be reproduced by a specific optical disc device outside the storage system without disclosing the device key information.

Embodiment 5

The fifth embodiment constitutes the device key by using a so-called "public key system" using a pair of the public key that is used for encryption and the individual key used for decryption. In other words, the device key storage unit 41 in the optical disc device that is shown in FIG. 2 stores the public device key and the individual device key. The public key and the individual key have a mathematical system and an algorithm such that they can mutually decrypt the data that is encrypted by using one of them as the encryption key, by using the other as the encryption key.

Figure 9:
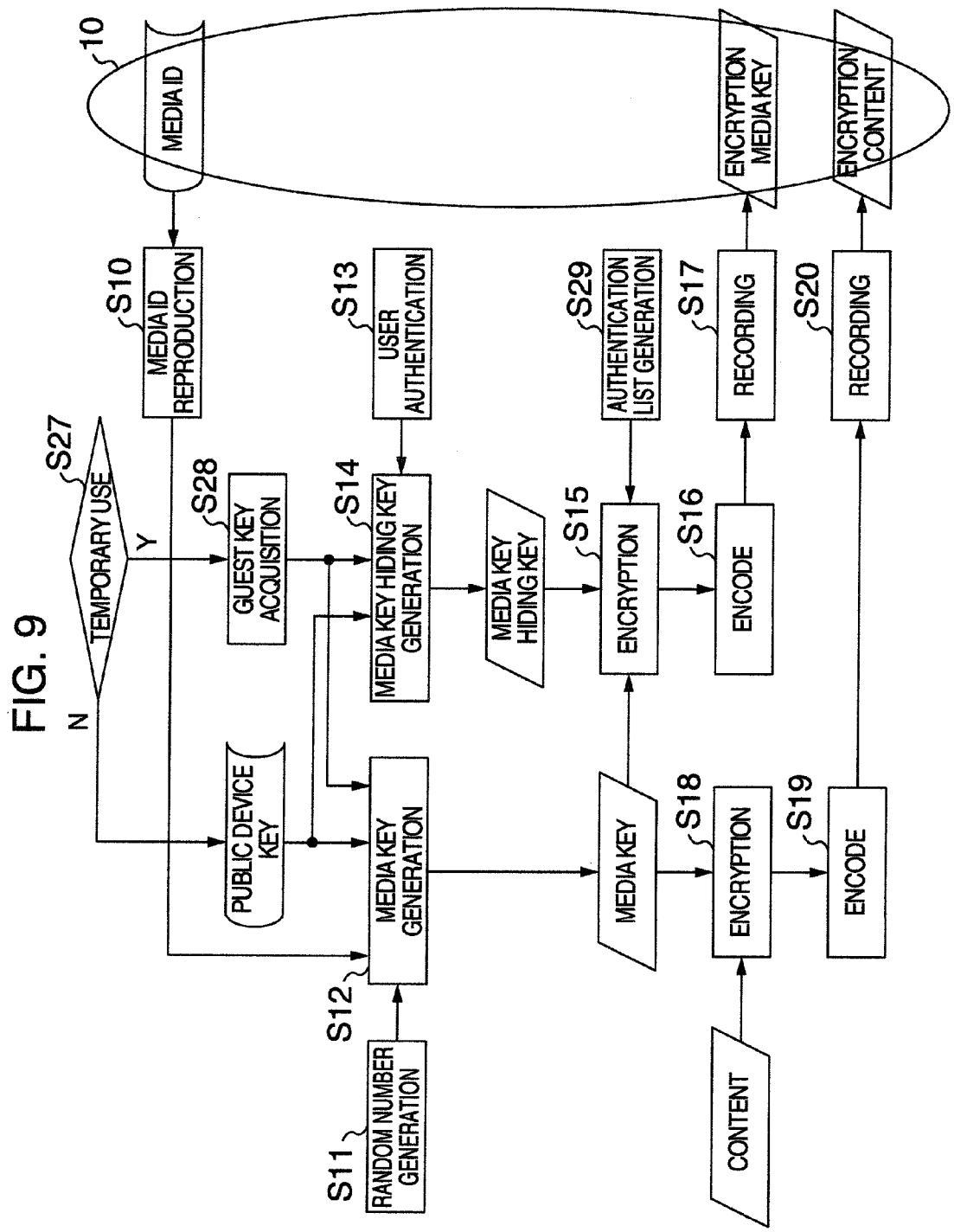
FIG. 9 is a flowchart showing a procedure for encrypting content data and storing it into an optical disc in a fifth embodiment.

FIG. 9 is an explanatory view for explaining a processing procedure for encrypting the content data and recording it to the optical disc in the fifth embodiment. However, the guest key is the public device key of the optical disc device which exists outside the storage system and for which reproduction is desired.

In S27, whether a temporary encryption processing when reproduction of the optical disc device outside the storage system is taken as the premise or an ordinary encryption processing is to be executed is judged.

As for the ordinary encryption processing, the encrypted content is recorded to the optical disc 10 in accordance with the processing procedure similar to that of the first embodiment. However, the media key is generated in S12 by using the public device key read out from the device key storage unit 41 and the media key hiding key is generated in S14.

As for the temporary encryption processing, on the other hand, the public device key of the optical disc device belonging to the different storage system for which reproduction is desired is acquired in S28 through the network. The media key is generated in S12 by utilizing the guest key so acquired, and the media key hiding key is generated in S14.

An authentication list containing information for specifying the optical disc device to which reproduction is to be permitted and the period in which reproduction is made is generated in S29.

The media key and the authentication list are encrypted in S15 by using the media key hiding key as the encryption key. Encryption is made in S16 and recording is made to a predetermined area of the optical disc 10 in S17. As for the content data to be recorded to the predetermined area of the optical disc 10 in S17, the content data is encrypted and recorded in the same way as in the first embodiment.

Figure 10:
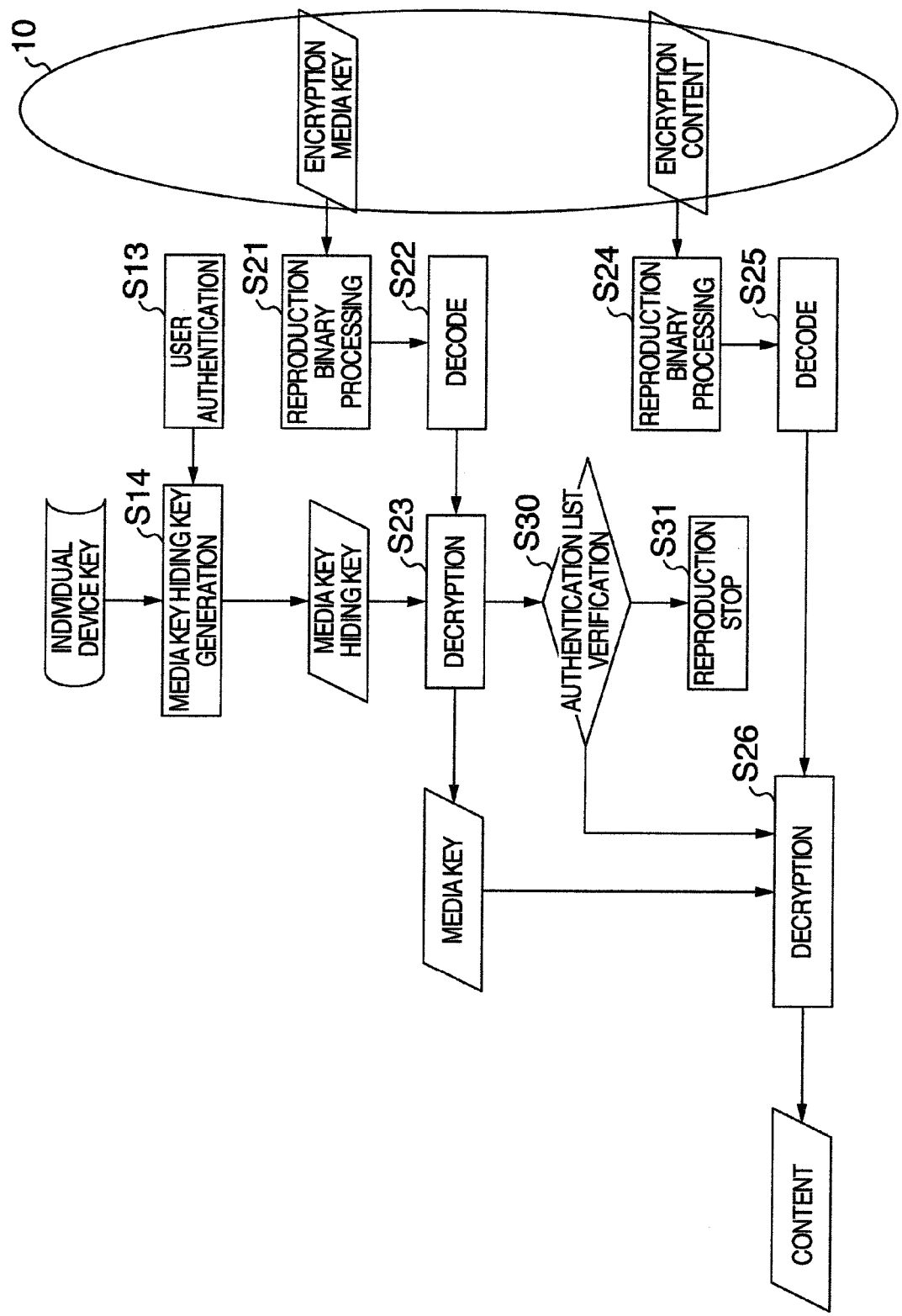
FIG. 10 is a flowchart showing a procedure for reproducing the content data encrypted and stored in the optical disc in the fifth embodiment.

FIG. 10 is an explanatory view for explaining a processing procedure for reproducing the content data encrypted and recorded to the optical disc in the fifth embodiment.

In S14, the media key hiding key is generated by the use of the individual device key read out from the device key storage unit 41.

The media key encrypted and recorded to the predetermined area of the optical disc 10 and the authentication list are decrypted and acquired in S23 by using the media key hiding key generated as the encryption key.

In S30, whether or not the reproduction is permitted is judged by verifying the authentication list. When the permission of reproduction is not judged as existing, the stop processing of reproduction is executed in S31. When the permission of reproduction is judged as existing, the content encrypted and recorded to the optical disc 10 is decrypted in S26 by using the media key acquired as the encryption key.

Incidentally, those kinds of processing which are shown in the drawings but are not explained are the same as those of the first embodiment.

The media key is the so-called "common key" that uses the same key for encryption and decryption. Encryption in S15, encryption in S18, decryption in S23 and decryption in S26 use mutually different algorithms.

As described above, this embodiment uses the construction in which the public device key used ordinarily is switchable as the temporary guest key to the public device keys of other optical disc devices and which can fabricate the optical disc encrypted in such a fashion as to be capable of reproduction by a specific optical disc device outside the storage system. The embodiment makes it possible further to limit the reproducible device and the reproduction period by encrypting and recording the authentication list with the media key. Accordingly, the device is more convenient because the key need not be switched at the time of reproduction.

Embodiment 6

FIG. 11 is a block diagram of a storage system in the sixth embodiment. An optical disc magazine 11 has a plurality of optical discs 10 and can be handled as one recording medium having a capacity corresponding to the number of the optical discs 10. Independent media ID is recorded in advance to each optical disc 10.

When the optical disc magazine 11 is mounted to the storage system 1, each optical disc 10 is taken out from the optical disc magazine 11 and is individually mounted to each optical disc device 1. Each optical disc device 1 has the parallel processing function of executing recording and reproduction to and from each optical disc 10 mounted. The rest of the constructions are the same as those of the foregoing embodiments and the explanation will be omitted.

FIG. 12 is an explanatory view for explaining a processing procedure for encrypting the content data and recording it to the optical disc in the sixth embodiment.

The media ID of the optical disc 10 acquired in S10 is transmitted in S32 to other optical disc devices 1 that execute the parallel processing. On the other hand, the media ID of the other optical disc 10 inside the same optical disc magazine 11 acquired by the other optical disc device 1 is received.

The system control unit 30 gathers and synthesize the media ID of each of the plurality of optical discs 10 provided to the optical disc magazine 11 in a predetermined procedure and hands it to the encryption key generation unit to generate the media key in S12. In other words, not only the media ID of the optical disc 10 mounted but also the media ID of the other optical discs 10 set to the same optical disc magazine 11 are utilized when generating the media key.

The media key is divided in S34 in a predetermined sequence into a plurality of parts corresponding to the number of optical discs 10 stored in the optical disc magazine 1. The part in the divided media key corresponding to the optical disc 10 mounted is encrypted in S15 by using the media key hiding key.

In S29, an authentication list containing information about the media ID of each optical disc 10 stored in the optical disc magazine 11 besides the information for specifying the optical disc device having the permission of reproduction and the reproduction permission period is generated.

The rest of the constructions and operations are the same as those of the foregoing embodiments and the explanation will be omitted.

FIG. 13 is an explanatory view for explaining a processing procedure for reproducing the content data encrypted and recorded to the optical disc in the sixth embodiment.

The encrypted media key is read out from the optical disc 10 mounted and is decrypted in S23 by using the media key hiding key to acquire the part corresponding to the optical disc 10 of the divided media key.

In S35, the part acquired is handed over to the other optical disc device 1 that executes the parallel processing. In the next step S36, the part of the divided media key that is recorded to the other optical disc 10 and acquired by the other optical disc device is received.

In S37, the media key is generated by gathering the parts of the recorded media key divided into a plurality of optical discs 10 provided to the optical disc magazine 11 and synthesizing or combining them in a predetermined sequence.

In S30, on the other hand, whether or not the list of the media ID of each optical disc 10 stored in the optical disc magazine is coincident with the media ID described in the authentication list is verified. When they are not coincident, there is the possibility that the disc is replaced. In this case, alarm information is generated and reproduction is stopped.

The rest of the constructions and operations are the same as those of the foregoing embodiments and the explanation will be omitted.

When recording and reproduction of data is made by encrypting the data in the optical disc magazine having a plurality of optical discs, the embodiment utilizes and synthesizes or combines the media ID of each optical disc and converts the media ID to a part of the authentication list. Furthermore, the embodiment divides the media key into parts, records the part to each optical disc, and reproduces and synthesizes or combines each divided part and generates the media key. Owing to this construction, the embodiment can confirm whether or not the combination of the optical discs in the optical disc magazine is appropriate and can prevent alteration by replacement of the optical discs.

This embodiment assumes particularly the optical disc device that handles the optical disc magazine and executes the parallel operation. Therefore, it is possible to employ the construction in which both encryption unit and decryption unit are provided in common outside each optical disc device as for the effect of preventing the alteration.

The invention is not particularly limited to the embodiments given above but includes various kinds of modifications. For example, the embodiments given above have been explained in detail in order to have the invention more easily understood and the invention is not particularly limited to those which have all the constructions described above. Furthermore, it is possible to add the construction of one embodiment to the constructions of others and to employ addition, deletion and replacement of other constructions for a part of each embodiment.

Each of the constructions described above may be constituted either partly or as a whole by hardware or may be constituted when a program is executed by a processor. The drawings illustrate only those control lines and information lines which are believed necessary for the explanation but do not always depict all those lines which are necessary for the products. It is possible to believe, in practice, that almost all the constructions are mutually connected.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A method for recording data in an optical disc, the method comprising: acquiring key information, generating a first encryption key and a second encryption key differently from each other on a basis of the key information, encrypting the second encryption key on a basis of the first encryption key to obtain an encrypted second encryption key and recording the encrypted second encryption key to the optical disc, and encrypting data on a basis of the second encryption key to obtain encrypted data and recording the encrypted data to the optical disc; wherein the key information is selectably providable as a first key information associated with an optical disc device for recording the encrypted second encryption key and the encrypted data to the optical disc or an arbitrary second key information for temporary use, in accordance with an optical disc device for reproducing the optical disc.

2. A method for recording an optical disc according to claim 1, wherein the key information is a public key of the optical disc device.

3. A method for recording an optical disc according to claim 1, further comprising: generating an information list about a reproduction condition of the optical disc, encrypting the information list on a basis of the first encryption key and recording the information list to the optical disc.

4. A method for recording a plurality of optical discs by using a plurality of optical disc devices, the method comprising: acquiring key information common to the plurality of the optical disc devices, generating a first encryption key and a second encryption key differently from each other on a basis of the key information, generating a plurality of encryption key parts by dividing the second encryption key, encrypting each of the encryption key parts on a basis of the first encryption key to obtain encrypted encryption key parts and executing recording of the encrypted encryption key parts to each of the optical discs, and encrypting data on a basis of the second encryption key to obtain encrypted data and recording the encrypted data to each of the optical discs.

5. A method for reproducing an optical disc, the method comprising: acquiring key information, generating a first encryption key on a basis of the key information, decrypting an encrypted second encryption key read out from the optical disc on a basis of the first encryption key, and decrypting encrypted data read out from the optical disc on a basis of the second encryption key; wherein
the key information is switchable as a first key information associated with an optical disc device for recording the optical disc and an arbitrary second key information different from the first key information for temporally use, and the first key information and the second key information are switched in accordance with an optical disc device for recording the optical disc.

6. A method for reproducing an optical disc according to claim 5, further comprising: reading out an information list about a reproduction condition of the encrypted optical disc from the optical disc, decrypting the information list on a basis of the first encryption key, and verifying the information list, and stopping reproduction when permission of reproduction does not exist.

7. A method for reproducing a plurality of optical discs by using a plurality of optical disc devices, the method comprising: acquiring key information common to the plurality of the optical disc devices, generating a first encryption key on a basis of the key information, decrypting each of encrypted encryption key parts read out from each of the optical discs to obtain a plurality of encryption key parts, on a basis of the first encryption key, generating a second encryption key on a basis of the encryption key parts, and decrypting encrypted data read out from each of the optical discs, on a basis of the said second encryption key.

8. An optical disc having a user data area for recording encrypted data, comprising an encryption key recording area for recording a second encryption key for decrypting the encrypted data and an information list about a reproduction condition of the optical disc, which are encrypted on a basis of a first encryption key.

9. An optical disc having a user data area for recording encrypted data, comprising an encryption key recording area for recording encryption key parts as parts of a second encryption key for decrypting the encrypted data, where the parts of the second encryption key are encrypted on a basis of a first encryption key.

* * * * *